United States Patent [19]

McClain et al.

[11] 4,150,003

[45] Apr. 17, 1979

[54] POLYMER DISPERSION PROCESS

[75] Inventors: Dorothee M. McClain; John Hoyt, both of Cincinnati, Ohio

[73] Assignee: National Distillers and Chemical Corporation, New York, N.Y.

[21] Appl. No.: 824,936

[22] Filed: Aug. 15, 1977

[51] Int. Cl.$^2$ ............................ C08K 3/24; C08K 9/05
[52] U.S. Cl. ................................ 260/23 H; 260/18 R; 260/23 AR; 260/23 ST; 260/29.6 PM
[58] Field of Search ....... 260/23 H, 29.6 PM, 23 AR, 260/23 ST

[56] References Cited

U.S. PATENT DOCUMENTS

| 2,653,919 | 9/1953 | Hunter | 260/23 H |
| 3,586,654 | 6/1971 | Lerman et al. | 260/2.5 B |

FOREIGN PATENT DOCUMENTS 88404  1972  Fed. Rep. of Germany.

*Primary Examiner*—James H. Derrington
*Attorney, Agent, or Firm*—Kenneth D. Tremain

[57] ABSTRACT

A process for forming dispersions of ethylenevinyl acetate copolymers using an alkali metal soap of higher carboxylic acids as dispersing agent.

10 Claims, No Drawings

POLYMER DISPERSION PROCESS

This invention relates to rapid processes for forming dispersions of thermoplastic resins, particularly resins of high molecular weight, in aqueous dispersion systems comprising alkali metal soaps of higher carboxylic acids, optionally in the presence of water-soluble salts.

CROSS-REFERENCES

Reference is made to commonly assigned, concurrently filed U.S. applications Ser. Nos. 824,873; 824,874; 824,875; 824,934; 824,935, commonly assigned U.S. application Ser. No. 564,198 filed Apr. 1, 1975.

BACKGROUND OF THE INVENTION

A vast art now exists which relates to the production of aqueous dispersions and emulsions of thermoplastic resins from the corresponding monomer or monomers by the methods of emulsion polymerization. These polymerizations are customarily performed in the presence of a considerable volume of water which may contain colloidal protectors or stabilizers, emulsifying agents of various kinds, free radical polymerization initiators, activators and promoters added to modify the action of the initiator, chain transfer agents for regulating molecular weight, chelating agents to intercept and neutralize the effect of metallic ions, as well as certain organic solvents to lower the freezing point of the system and otherwise modify the polymerization. Many of the thermoplastic polymers produced in this way by dispersion or emulsion polymerization can also be converted to powders by such processes as coagulation, spray drying, etc.

In general, the design of a useful dispersion or emulsion polymerization system poses two different but interrelated problems:

(a) the polymerization itself, which, as a process taking place in two or more discrete phases, is often extremely sensitive to changes in conditions and impurities; and (b) the colloid system which is the end product of the polymerization and is often unstable, variable in its properties and difficult to reproduce. And when the solid polymer product is isolated, it characteristically contains, as impurities, small amounts of the various substances introduced to promote the polymerization and stabilize the colloid system. In addition, dispersion and emulsion polymerization processes typically require several to many hours for completion, and are thus distinctly slow processes. In particular, the art discloses (U.S. Pat. No. 3,534,009) that in the batch emulsion polymerization of ethylene and vinyl acetate, an extraordinarily long polymerization time is required to consume all the vinyl acetate monomer charged, and it is necessary to resort to other means to accomplish this objective, such as reduction of ethylene pressure and the addition of more free-radical promoter. In this respect emulsion polymerization processes are at a decided disadvantage relative to the continuous, high pressure bulk polymerization processes now used commercially for the manufacture of low density polyethylene and ethylene copolymers. These latter processes proceed at exceedingly rapid rates; for example in a typical low density polyethylene process, as carried out in a reactor of the type described in U.S. Pat. No. 3,756,996, the polymerization times are of the order of 35 to 45 seconds at a conversion of 12 to 20%, and the total time required to convert monomer(s) to finished polymer is about 10 minutes.

A further disadvantage of the dispersion and emulsion polymerization processes of the art is that they are as yet of no, or only limited applicability in the manufacture of several important thermoplastic resins of commerce. For example, when ethylene is polymerized in emulsion, polyethylene is produced at typical emulsion polymerization rates (1–7 hours), but it contains residues derived from the emulsifier and a relatively large low molecular weight fraction [G. J. Mantel et al, J. Appl. Polymer Sci., 9, 1797, 1807, (1965); 10, 81, 1845 (1966)]. Emulsion polymerization is substantially of no utility in the polymerization of such monomers as propylene, higher alpha-olefins and isobutylene, since these monomers do not produce high polymers by a radical mechanism. Much the same situation holds for the thermoplastic resins produced by polycondensation processes.

It has long been known that many low molecular weight polymers, e.g., various waxes and hydrocarbon resins, can be emulsified in water by first dissolving them in an organic solvent, then contacting the organic solution of the polymer with water in the presence of surface active agents and emulsifiers, and thereafter recovering the organic solvent. This basic process has also been extended to true high polymers. Thus a process is known (U.S. Pat. No. 3,347,811) for preparing aqueous dispersions of ethylene copolymers which comprises (a) dissolving the copolymer in a water-immiscible organic solvent of b.p. 40°–160° C.; (b) emulsifying the solution in a mixture of water and a dissolved surfactant of HLB number of at least 18; and (c) evaporating the organic solvent from the resulting emulsion.

Similarly it is known (U.S. Pat. No. 3,503,917) to prepare artificial latexes, e.g., of polyisobutylene-isoprene copolymer (butyl rubber) and ethylene-propylene rubber, by dissolving the preformed polymers in an organic solvent such as toluene, emulsifying the organic solution of the polymer in water in the presence of a surface active agent, and finally stripping the organic solvent. It is especially to be noted that these processes of the art for dispersion of true high polymers are by their very nature complicated, laborious and, above all, comparatively slow.

In recent years, however, a new simplified process (U.S. Pat. Nos. 3,422,049; 3,746,631) has been developed for making dispersions of high molecular weight thermoplastics in water, without the need for an organic solvent. In several important respects the new process differs from all other polymer dispersion processes of the art:

(1) It is a rapid process, requiring a residence time of about 15–20 minutes in its continuous version (U.S. Pat. No. 3,432,483), and operates at 115° C. to 300° C. in the presence of only water and a surfactant, for which reason it is often called the "water process." In view of the short contact time, it is therefore particularly advantageous to couple the water process with the above-mentioned, equally rapid, high pressure process for making polyethylene and ethylene copolymers; when this is done, dispersions of these polymers can be produced from monomers in overall process times of the order of a half-hour or less.

(2) However, prior to the present invention, only a very unique class of surfactants, certain block copolymers of ethylene oxide and propylene oxide, could be used to produce the dispersions.

(3) The particles produced are substantially all spherical, very fine, and tend to be of a narrow particle size range; low density polyethylene, for example, is converted to spherical particles having a number-average particle diameter of about 10 microns, and a weight average diameter of about 25 microns.

(4) Since the water-process does not require the use of an organic solvent, it avoids all the disadvantages associated with prior art processes requiring solvents, such as: solvent loss during processing with attendant air pollution; the fire hazard inherent in solvent usage, and the time and energy expended in dissolving a high polymer in a solvent, and in recovering and recycling the solvent. However, when it is desired to make dispersions of even finer particle size, i.e., particles of submicron diameter (U.S. Pat. No. 3,418,265), limited amounts of organic solvent are advantageously added in the water process, but in amounts of only 0.5 to 20 parts per 100 parts of the resin to be dispersed, amounts that are far less than those required to dissolve the resin in the other processes of the prior art. Additionally, in another version of the water process (U.S. Pat. No. 3,522,036), limited amounts of a liquid vinyl monomer, e.g., styrene, may also be added to provide stable, film-forming aqueous latices of high molecular weight polyethylene. In still other variants it is possible to produce foamed particles (U.S. Pat. No. 3,472,801) or to incorporate certain colorants (U.S. Pat. No. 3,449,291) and pigments (U.S. Pat. No. 3,675,736) in the particles.

The above described fine powders are, by virtue of their small particle size, their narrow particle size range, and their spherical particle shape, unique states of matter which cannot readily be prepared by conventional procedures known to the art. However, as already pointed out above, a unique nonionic surfactant or dispersing agent is required, i.e., the aforesaid block copolymer of ethylene oxide and propylene oxide more fully described in U.S. Pat. No. 3,422,049 and sold under the trade name of Pluronics by BASF-Wyandotte Corp. Nevertheless, as experience has accumulated in the use of these nonionic dispersants, certain disadvantages have become apparent.

The very fine particle size fraction they produce, e.g., the aforesaid 10 micron particle can present problems in certain situations:

(a) fractions comprising particles 10 microns or less in diameter are classified as "respirable dusts" and may present a health hazard if they escape into the work place air;

(b) in addition, these ultrafine fractions can at times cause problems in powder handling equipment because of plugging and blockage.

Although art related to the water-process (U.S. Pat. No. 3,586,654) does disclose that the particles produced by that dispersion process may be reformed into particles that are the same, larger, or smaller in diameter, this conversion involves two operations and it requires the use of such large amounts of Pluronic dispersant as to be relatively disadvantageous from an economic point of view. Consequently, it would be highly desirable to modify the water-process in such a manner as to be able to disperse thermoplastic resins into particles of any desired particle size in one operation, and to achieve this goal by using economically acceptable levels of dispersing agent (preferably up to about 15 pph of resin), i.e. by substituting a simple dispersion system comprised of readily available components and which obviates some, if not all, of the difficulties encountered with the Pluronic dispersants.

Moreover, increasing petroleum prices make it highly desirable, again for economic reasons, to eliminate, if possible, the requirement for the petroleum-based Pluronic dispersants. Additionally, as disclosed in commonly assigned, copending application Ser. No. 564,198, dealing with the simultaneous saponification and dispersion of ethylene-vinyl acetate copolymers, it appears that the Pluronic dispersants are quite sensitive to the presence of metallic salts. When the polymer to be dispersed contained 0.1% or more of sodium ion, the copolymer could not be dispersed to a fine particle size until the sodium ion content is reduced to less than 0.1%.

It is known in the art to employ soaps as emulsifying agents in the emulsion copolymerization of monomers such as styrene and butadiene to produce latices of synthetic rubber. It is further known that the dispersed or emulsified synthetic rubber particles may be coagulated by adding salt or salt and acid to the latices; in this way the rubber may be conveniently recovered as a rubbery crumb. Moreover, if desired, the particle agglomeration process may be arrested at an intermediate particle size by adding salt to the latex, and/or by forming a salt in situ by adding an acid and later a base. Rhines (U.S. Pat. No. 2,538,273), for example, shows that in this latter process, the amount of acid and/or salt necessary to increase particle size can be reduced by also adding an alcohol.

The processes of the present invention, however, differ fundamentally from these teachings of the art in the following important respects:

1. They relate to the dispersion of already-formed synthetic resins, principally and advantageously to those selected from the group of synthetic resins that cannot readily or conveniently be made by emulsion or dispersion polymerization of the respective monomer or monomers, or which require long emulsion polymerization times. Typical of these resins are ethylene-vinyl acetate copolymers containing about 35 to 85 weight percent of vinyl acetate. The resin, for example in the form of pellets, slabs, or solid masses that have acquired the form of their container on standing, is dispersed in water at elevated temperatures and pressures, as disclosed in the aforesaid water-process, but in the presence of a soap and optionally a salt as the dispersing system instead of the Pluronic surfactant. The polymers generally require preliminary size-reduction, as by cutting or guillotining into pieces small enough to be fed to the process. Thus the processes of the present invention lead to a reduction in the size of resin particles, and not in general to the agglomeration of fine particles to coarser particles.

2. They represent dispersion processes wherein the resin may be dispersed by a soap alone. However, salts may also be used and where used are always present during the dispersion process. The primary particles produced are smaller than the particles produced with a soap alone under otherwise similar conditions. The smaller primary particles, however, tend to agglomerate so that larger ultimate particles are often obtained when a salt is present during dispersion.

3. They represent dispersion processes in which, in the case of ethylene-vinyl acetate copolymers containing about 35 to 85 weight percent of vinyl acetate, there is a tendency for the molecular weight of the polymer substrate to increase to some extent as a result of the dispersion process. The extent of increase is greater for higher molecular weight copolymers, and eventually, for high enough molecular weight polymer substrates, the powder product is replaced by a crumb. Molecular weight increase and crumb-formation can, however, be substantially suppressed by including a radical inhibitor in the dispersion process.

4. They represent dispersion processes in which an optimum salt concentration range can usually be discerned below which there is relatively little effect on particle size and above which no dispersion is obtained.

5. They represent dispersion processes in which the variables such as the nature of the resin, i.e., its composition and melt viscosity; the resin solids content, i.e., ratio of resin to water; nature of the soap, i.e., size of the acid residue; the identity of the cation; the concentration of the soap; and the concentration of the salt are all interrelated with each other and especially with the dispersion temperature selected. This dynamic system of variables is much more intricate in nature than latex coagulation processes of the art.

Processes for simultaneously dispersing and saponifying ethylene-vinyl acetate (EVA) copolymers to provide particulate hydrolyzed ethylene-vinyl acetate (HEVA) copolymers are known. In German Democratic Republic (DDR) Patent Specification No. 88,404, there is described a process for simultaneously dispersing and saponifying EVA copolymers employing sodium hydroxide or potassium hydroxide as the saponification agent and an alkyl sulfonate, an acyl derivative of N-methyltaurine, a higher fatty acid soap, an alkaryl sulfonate or a nonionic surface-active agent derived from ethylene oxide as the dispersion agent.

The process described involves saponifying ethylene-vinyl acetate copolymers at elevated temperature and pressure including, as the final step, discharging the reaction mixture at the operating temperature and pressure directly into a quench vessel at atmospheric or subatmospheric pressure. The quench vessel contains water that is stirred during the discharge operation and the rate of discharge of the reaction mixture is regulated by means of a needle valve. Thus, the sudden release of the reaction mixture causing a portion of the reaction medium to varporize apparently results in formation of the dispersion due to the atomizing effect of the needle valve. This patent also discloses the optional use of dispersants, but it is apparent from the data provided that such dispersants have only a secondary effect, the primary determinant of dispersion being the discharge of the hot reaction mixture to the quenching bath. From the particle size distribution data provided in the disclosure, it is clear that the presence of dispersing agent seems to favor smaller particles, but is not absolutely essential since comparable dispersions are obtained when dispersing agents are not present in the reaction mixture. There is no indication that a dispersion of the polymer occurs in the reaction mixture prior to discharge when dispersing agents are present but the data provided shows that, on discharge, a dispersion is produced in the presence or absence of dispersing agent. Attempts to obtain dispersions of saponified EVA using N-oleoylsarcosinate as dispersing agent by merely cooling the reaction mixture without the described discharge step of DDR 88,404 have not produced dispersions. Similarly, when arylsulfonate dispersants are employed in lieu of the sarcosinate, no dispersions are obtained when the reaction mixture is cooled. Thus, it must be concluded that dispersion only occurs on discharge.

The dispersed product obtained by method of 88,404 is of fairly large particle size, the heavy majority of the particles being of diameters greater than 0.125 mm, i.e., usually over 80% of the dispersed particles. In addition, the product is composed of irregular particles, with no spherical particles being observed.

In accordance with the present invention, desirable improvements are achieved by substituting dispersant systems comprising alkali metal soaps of higher carboxylic acids optionally in conjunction with water-soluble salts for the unique Pluronic dispersing agents of U.S. Pat. Nos. 3,422,049 and 3,476,631.

The invention provides dispersing systems for dispersing high molecular weight copolymers of olefins in water at rapid rates and avoids the need for an organic solvent. The novel dispersing system thus provided generally yields particles that are larger than those produced by the Pluronic dispersing agents of the art and affords a wider range of particle size than the Pluronic dispersants, without, however, requiring the use of large amounts of dispersant. Additionally, they practically eliminate the at times objectionable ultrafine, 10-micron or less particle fractions present in powders produced by the Pluronic dispersants.

In general, the present process can be carried out substantially as described in the basic water-process patent (U.S. Pat. No. 3,422,049), with the exception that the Pluronic surfactants of that process are replaced with dispersing agents comprising a soap of a higher carboxylic acid and, optionally, a water-soluble substantially neutral salt.

Thus, in batch operation, the polymer, water (preferably distilled or deionized) and the dispersant system are introduced into a pressure vessel equipped with an external heater, a thermocouple, and a stirrer. The vessel is sealed, heated to 130°–250° C. and held at the selected temperature for a brief period, usually seven minutes, during which time rapid stirring is applied. Thereafter, the heater is shut off and the vessel is allowed to cool with stirring, and optionally with externally-applied cooling for convenience. When the temperature of the contents of the vessel has fallen below about 100° C., the product is discharged, optionally diluted with additional deionized or distilled water, cooled to about room temperature. The dispersion may, if desired, be used directly in various applications. The tackiness of the polymers of the present invention complicates their recovery from dispersion in the particulate form by conventional operations such as filtration. Without special precautions, the dispersed polymer particles tend to coalesce upon filtration. This difficulty may, however, be easily avoided by such measures as converting the soap after dispersion into a less soluble form, e.g., acidification to release the corresponding higher carboxylic acid or reaction with a metal salt to produce an insoluble soap (Ca, Mg soap, etc.), thereby providing a parting agent for the dispersed tacky polymer particles, as more fully described in copending, concurrently filed U.S. patent application Ser. No. 824,935.

The filter cake is washed with cold water, preferably deionized or distilled, to remove contained water-soluble, substantially neutral salt and the washings are combined with the mother liquor. The combined mother liquor and washings contain substantially all of the water-soluble salt, but very little of any soap or higher carboxylic acid if this has been released as a parting agent by acidification of the soap dispersant. The acid employed for acidification is desirably selected to match the anion of the water-soluble, substantially neutral salt, e.g., hydrochloric acid for sodium chloride. When a metal salt, e.g., calcium hydroxide, is added to convert the higher carboxylic acid soap to an insoluble soap (calcium soap) for a parting agent, the mother liquor will contain alkali metal hydroxide which can be recycled, for example to make additional in situ soap or simply neutralized to provide more water-soluble salt. Normally a substantial proportion of the water is then removed by distillation and the residue, containing substantially all of the water-soluble salt and alkali (if any) can be recycled.

DESCRIPTION OF PREFERRED EMBODIMENTS

The substrate, i.e. the polymer to be dispersed, is a polymer or copolymer that is a copolymer of an olefin containing from about 35 to about 85 weight percent of a polar comonomer, e.g. vinyl acetate. The dispersant system is a soap of a higher hydrocarbon carboxylic acid, optionally in the presence of a water-soluble, substantially neutral salt. The soap can be preformed soap or alternatively the soap can be produced, in situ, with substantially the same results as far as dispersion formation is concerned.

Each of the components may be introduced independently and separately but it is also possible to combine two or more of the components before introduction into the dispersion vessel. For example, the water-soluble salt and the preformed soap, when used, are conveniently added in solution in part of the water used to produce the dispersion. Where in situ soaps are employed, the base introduced to neutralize the acid may also be added in aqueous solution, either in a separate solution or in the same solution as the water-soluble salt. However, it is preferred not to add a preformed soap in the same solution as the water soluble salt. The polymer itself may also be employed as a medium for introducing the other components. Thus, for example, where an in situ soap is desired, it is convenient to blend the fatty acid into the polymer before introduction into the dispersion, and, where a preformed soap is employed, this, too, can be blended into the polymer prior to dispersion. Less commonly, the water-soluble salt is blended into the polymer before dispersion, either alone or in combination with the fatty acid for making in situ soap. The practice of blending into the polymer water-soluble salt, acid for in situ soap and base to make the in situ soap before dispersion is ordinarily not preferred.

As an alternative in situ soap formation, the soap can be formed from a glyceride or other ester by saponification with slightly more than the stoichiometrically required amount of base. The triglyceride or other acid ester may be added directly to the dispersion vessel or previously blended into the polymer along with the other dispersion components.

The various embodiments of the invention may also be carried out as a continuous operation, in the manner described in U.S. Pat. No. 3,432,483. In such continuous operation the polymer to be dispersed is fed to the bottom of the dispersion vessel and the dispersion is removed at the top of the dispersion vessel. Separate lines supplying the various components of the dispersion enter the bottom of the vessel itself which can be provided with a pre-mixing zone. The components may be introduced separately or in combination as hereinbefore described.

In general the properties of the type of polymers dispersed are not significantly affected by the dispersion process although some slight degree of saponification may occur.

Although it is more advantageous to employ the process to disperse high molecular weight polymers, that is to say polymers having a number average molecular weight of about 10,000 and above, this should not be understood as limiting the process to such polymers, since it is also within the scope of the invention to disperse polymers having a number average molecular weight below about 10,000 even as low as about 1000–1500. Mixtures of polymers may be dispersed.

The type of polymer that is dispersible by the process of the invention is not limited in any way as to method of synthesis. In general, however, the polymers selected will most often be made by free radical addition polymerization processes used commercially to manufacture low density polyethylene. Certain other dispersible polymers are made by Ziegler-Natta and Phillips polymerization processes, and even by low temperature cationic polymerization. Polymers made by various types of polycondensation may also be dispersed. Nor are the polymers that may be dispersed by the process of the invention limited as to the number of different repeat units that make up the chain molecules, or the order of their occurrence. Included are random copolymers, alternating copolymers, block polymers and graft polymers.

Examples of the classes of polymers that are dispersible by this invention are olefin-vinyl ester copolymers, ethylene-vinyl alcohol copolymers, olefin-acrylate ester copolymers ethylene-vinyl ester-vinyl alcohol terpolymers, olefin-vinyl ester-sulfur dioxide terpolymers, olefin-vinyl ester-carbon monoxide terpolymers, olefin-vinyl ester-vinyl alcohol-carbon monoxide tetrapolymers and acrylate and methacrylate ester homo- and co-polymers. Moreover, analogous styrenic polymers, polyphenylene oxides, polyphenylene sulfides, polyaryl sulfones, polyethersulfones, polyimides, polyesters, polyamides, polyurethanes and cellulosics are also within the scope of this invention.

Specific examples are poly (ethylene-co-vinyl acetate) containing from about 35 to about 85 weight percent vinyl acetate; poly (ethylene-co-methyl acrylate) and poly (ethylene-co-ethyl acrylate) containing from about 35 to about 85 weight percent of the acrylate ester; poly (styrene-co-acrylonitrile) from about 35 to about 85 percent acrylonitrile; poly (ethylene-co-vinyl acetate-co-vinyl alcohol) containing from about 35 to 85 weight percent of combined vinyl acetate and vinyl alcohol, poly (ethylene-co-vinyl acetate-co-sulfur dioxide or co-carbon monoxide) with from about 35 to about 85 weight percent of total monomer units other than ethylene, and poly (ethylene-co-vinyl acetate-co-vinyl alcohol-co-sulfur dioxide or co-carbon monoxide) also containing from about 35 to about 85 weight percent of monomer units other than ethylene.

The preferred soaps are soaps of alkali metals of atomic weight of at least 23, i.e. sodium, potassium rubidium and cesium, and, of these, the more preferred are sodium and potassium because of the availability or ease of preparation, the most preferred being sodium which is most economical and practical.

The soaps for use in the present invention are known compounds, i.e. salts of higher carboxylic acids with the alkali metals. The acid moiety of the soap can be saturated or unsaturated, most commonly ethylenically-unsaturated, and can be composed of a mixture of such acids, for example as is obtained by saponification of natural glyceride fats. Included in the term "fatty acid" as used in this invention are the so-called dimer acids made by dimerization of polyunsaturated linear fatty acids. Rosin or abietic-type soaps are also effective dispersants for the copolymers of this invention. The soap should not react adversely to any appreciable extent with the polymer substrate, i.e. should be substantially inert to the polymer. As employed herein, and in the appended claims, the term "soap" embraces the aforesaid salts of said acids.

The preferred fatty acid is a straight-chain $C_8$–$C_{22}$ monocarboxylic acid, which may be saturated or may contain one or more carbon-carbon double bonds per molecule, and may contain even or odd number of carbon atoms. Examples are caprylic acid, pelargonic acid, capric acid, undecanoic acid, lauric acid, tridecanoic acid, myristic acid, pentadecanoic acid, palmitic acid, margaric acid, stearic acid, nonadecanoic acid, arachidic (arachic) acid, heneicosanoic acid, behenic acid, 10-undecylenic acid, elaidic acid, oleic acid, erucic acid, brassidic acid, linoleic acid, and linolenic acid as well as mixtures of such acids, and dimeric acids made by the dimerization of polyunsaturated fatty acids, e.g. linolenic acid. Dimeric acids are commercially available and contain 75–95% dimer, 4–25% trimer, and from a trace to 3% of monomeric polyunsaturated fatty acid. Rosin or abietic type acids useful in this invention are hydrogenated rosin, dehydrogenated rosin, and polymerized rosin, all of which are available commercially, e.g., from Hercules Inc., under the trade names of Resin 731D, and Polypole, respectively.

Where a pre-formed soap is introduced, it will be a soap prepared by neutralization of one of the above disclosed acids or mixtures, with one or mixtures of the bases disclosed below or alternatively, commercially available fatty acid salts can be used.

When an in situ soap is employed, the soap is formed by reacting the fatty acid with an alkali metal hydroxide. Alternatively, the corresponding bicarbonate or carbonate can be used. Examples of the alkali metal hydroxides that may be used are sodium hydroxide, potassium hydroxide, lithium hydroxide, rubidium hydroxide and cesium hydroxide; sodium bicarbonate and sodium carbonate; potassium bicarbonate and potassium carbonate; rubidium bicarbonate and rubidium carbonate; and cesium bicarbonate and carbonate may be substituted for the corresponding hydroxides. Mixtures of the said alkali metal compounds can be employed.

The optional water soluble salt is a substantially neutral salt. For the purposes of this invention such a salt is defined as one that, at a concentration of 1.0 molar in pure water at 20° C., produces a solution whose pH lies between 4 and 9. The cation of salt is derived from an alkali metal or any other metal that does not form insoluble soaps with the above-disclosed fatty acid selected, at the operating temperature of the process i.e., is inert to the soap employed. The cation may be monovalent, divalent or of higher valence. The nature of the anion of the salt does not appear to be critical; the anion can be for example, fluoride, chloride, bromide, iodide, bisulfate, sulfate, phosphate, hydrogen phosphate, dihydrogen phosphate, nitrate, hydroxide, bicarbonate, carbonate, acetate or propionate anion, or similar such anions. Mixtures of salts can be employed.

Specific examples of the water-soluble salts are lithium fluoride, lithium chloride, sodium bisulfate, sodium sulfate, sodium hydrogen phosphate, ammonium chloride, potassium dihydrogen phosphate, sodium carbonate, sodium acetate and sodium propionate, etc. The cation of the soap and the water-soluble salt may be the same or different.

It is usually preferred that the ratio of polymer to water range from about 0.1 to about 3 parts of polymer per part of water on a weight basis. Lower ratios are operable, but uneconomical, whereas higher ratios, though usable, present operational difficulties. The most preferred range is about 0.2 to about 1.5 parts of polymer per part of water on a weight basis. For in situ soap formation, the mole ratio of base to the amount of fatty acid may vary from about 1.0 to about 1.15, the preferred ratio is from about 1.05 to about 1.1. Lower ratios are operable, but may result in increased tackiness of the polymer due to solution of unneutralized fatty acid therein. Higher ratios are of no advantage. When base-sensitive, e.g., hydrolyzable, polymers are to be dispersed, excess base is preferably avoided where hydrolysis is not desired. The weight ratio of fatty acid soap to polymer may vary from about 0.01 to about 0.3, the preferred ratio being from about 0.05 to about 0.15. The use of lower ratios of soap does not always result in the desired dispersion of the polymer; higher ratios are generally unnecessary and therefore uneconomical. The preferred fatty acid soap is sodium stearate.

The concentration of water-soluble salt in water may range from at least about 0.1 and up to about 15 weight percent, the preferred concentration being from about 1 to about 7 weight percent based on water. Dispersions are not readily obtained at lower concentrations and higher concentrations are unnecessary. In addition, higher concentrations tend to cause larger particle size. Thus there appears to be an optimum salt concentration. Sodium chloride, sodium sulfate, and sodium acetate are the preferred water-soluble salts. These salts are preferred because hydrochloric acid, sulfuric acid, or acetic acid, respectively, may then be used to acidify the soap to provide a parting agent of the corresponding carboxylic acid to the tacky dispersed particles while producing the same water-soluble salt used in the dispersion. Halide salts, particularly chlorides, though operable, are not preferred with stainless steel equipment because of the tendency to cause stress cracking of the steel. A nickel alloy (Monel) is preferred for chloride service.

The dispersion temperature may range from about 100° to about 270° C., but temperatures of from about 150° to about 250° C. are preferred. Dispersions are usually not readily obtainable at lower temperatures and higher temperatures are usually not required for successful dispersion. The pressure is autogenous. The rate of stirring should vary from about 1200 to about 4000 rpm with from about 1800 to about 3800 rpm being preferred, although stirring rates that are lower are at times sufficient. Higher stirring rates may be employed but usually are not advantageous. The dispersion times range from about 1 minute to about 1 hour; times of about 5 to about 15 minutes are preferred.

The production of successful dispersions in accordance with the present invention is dependent upon a number of factors including the nature of the selected soap, the amount of the soap present, the amount of salt present (when used), the temperature at which dispersion is effected and the molecular weight of the polymer substrate. In addition, to a lesser extent, the cation of the soap may often determine the efficiency of dispersion.

In general, the soaps of higher carbon content, i.e. at least about 16 carbon atoms e.g. stearates and behenates, are effective without added salt in producing desired dispersions whereas myristate soaps are not as effective. At the effective levels of stearate soaps, the myristate soaps at times give no dispersion of the polymer substrate, unless salt is also present. When a salt is used along with the myristate soaps, they compare favorably with stearate soaps without added salt, although the yield of dispersion is somewhat lower. When soaps of carbon content intermediate myristate and stearate soaps are employed, the dispersion yield progressively increases with carbon content.

The amount of salt present, when used, is also a determinant of the dispersion efficiency. When the aforesaid myristate soaps and soaps of intermediate carbon content, the amount of salt required for optimum dispersion is considerably higher than that employed with stearate soaps. Behenate soaps appear to differ somewhat from stearate soaps with respect to optimum salt effect. As larger amounts of salt are employed, the behenate soaps generally become less efficient.

Thus, from these considerations, it becomes apparent that, for any given soap, there will be a range of optimum salt concentrations, lower concentrations will be ineffective or inefficient in producing dispersions; higher concentrations are disadvantageous and are uneconomical. Optimum salt concentration is also observed in the dispersion of polyethylene, as shown in copending, concurrently filed U.S. patent application Serial No. 824,874, Example 6. The optimum salt concentration is readily determined for any given soap concentration by finding the salt concentration where 100% dispersion occurs. The optimum salt concentration, of course, would be for the particular soap concentration evaluated.

In addition to the foregoing considerations, the temperature of dispersion is apparently of considerable importance. For example, at 235° C., behenate soaps failed to disperse polymer substrates relatively high in polar comonomer, e.g., those containing about 60 weight percent of vinyl acetate, but at lower temperatures, excellent dispersions are obtained, e.g. at 188° C. a fine dispersion is obtained in 100% yield with sodium behenate and at 185° C. a coarser dispersion is obtained with lithium behenate. In contrast, as described in copending, concurrently filed U.S. patent application Serial No. 824,875, lithium behenate forms excellent dispersions of polyethylene at 235° C. Thus, these results appear to suggest a possible mechanism of dissolution of the dispersant in the relatively more polar polymer substrates of this invention, rather than a coating effect, which occurs at the higher dispersion temperatures.

The cation of the soap also appears to have significance in the dispersion process, with ammonium soaps being least effective and lithium soaps being somewhat less ineffective. With the higher soaps of alkali metals of atomic weight of at least 23, e.g. sodium stearate and sodium behenate, effective and efficient dispersions are readily obtained with and without added salt. It is for this reason that such alkali metal soaps are preferred. The added salt, when used, favors larger ultimate particle sizes when compared to the particle size produced with the same soap without added salt. Thus, with sodium stearate, the presence of sodium chloride or sodium sulfate causes a larger ultimate particle size than realized with sodium stearate as the sole dispersant. The tendency for larger ultimate particles to be obtained in the presence of salt appears to be more pronounced at higher dispersion temperatures (235° C.) than at lower dispersion temperatures (150° C.). The effect also seems to be more noticeable with lower molecular weight resins.

This increase in ultimate particle size in the presence of added salt appears to be the result of agglomeration of smaller primary particles, as may be determined by microscopic examination of the dispersion. Little agglomeration of the primary particles takes place if salt is absent. Moreover, microscopic examination also reveals that the primary particles produced in the presence of salt are much smaller than the primary particles produced in the absence of salt, although experimental difficulties so far have precluded quantization. Thus the general effect of added salt in providing smaller particles that was disclosed in copending applications, concurrently filed U.S. patent application Ser. Nos. 824,873 and 824,874 also holds for polymers of the present invention, but is complicated by a superimposed agglomeration effect, so that the ultimate particles (containing agglomerates) isolated with parting agent are larger when salt was present in the dispersion system. Presumably agglomeration is favored by the tacky nature of the polymers of the present invention and by the relatively smaller size of the primary particles produced in the presence of salt.

For isolation as a powder, the product can be treated by the addition of a parting agent for the dispersed particles of polymer prior to separation from the dispersion system. Conveniently, the parting agent can be formed in situ from the soap already present, either by conversion with acid, e.g. hydrochloric, to the higher fatty acid which will coat the polymer particles, or by conversion to an alkaline earth metal (Ba, Ca, Sr) soap which serves as parting agent for the disperse polymer, or a combination of both fatty acid and alkaline earth metal soap by controlling the amounts of each, i.e. acid and alkali metal ions, added. For best results, the alkaline earth metal soap is preferred particularly the calcium soap, as described in copending, concurrently filed U.S. patent application Ser. No. 824,935, incorporated herein by reference for its disclosure.

The dispersion temperature also influences the dispersion process, especially for polymers containing relatively large proportions of a polar monomer. Thus ethylene-vinyl acetate copolymers containing about 60 weight percent vinyl acetate are generally more difficult to disperse at 235° C. than at 185°–190° C., but this effect is not as severe for a copolymer containing only about 40 weight percent vinyl acetate.

For the polymer substrates of the present invention, e.g., ethylene-vinyl acetate copolymers containing from about 35 to 85 weight percent of vinyl acetate, it is found that the molecular weight of the polymer substrate has an effect on dispersibility, and in turn the dispersion process can have a decided effect on the molecular weight of the dispersed polymer. Often, but not always, there tends to be a moderate increase in molecular weight upon dispersion. This increase is conveniently assessed by means of melt flow rate measurement before and after dispersion, or more conveniently by means of Mooney viscosity change as a result of the dispersion process.

The aforesaid increase in molecular weight may result in as much as a two- to three-fold increase in Mooney viscosity. Thus, polymer substrates initially having a Mooney viscosity of about 12–13, hereinafter referred to as "low Mooney" polymer, will yield a powder product having a Mooney viscosity of about 20–22, exceptionally as high as 36. But if the polymer is one having an initial Mooney viscosity that is substantially higher, of the order of about 19–23 to start with, hereinafter referred to as a "high Mooney" polymer, the product is generally a crumb or granular material; the desired powder is usually a minor component, Mooney viscosities of up to 54 have been observed for these granular or crumb products, yet none were found to be insoluble in hot xylene, i.e., they were not gelled. In addition, the increase in Mooney viscosity is higher at a lower temperature (185° C.) than at a higher temperature (235° C.). Since the high pressure copolymerization process employed to synthesize the ethylene-vinyl acetate copolymers of this invention will produce polymers having Mooney viscosities no higher than about 10–25, i.e., substantially the low Mooney and high Mooney polymers as defined herein, the present dispersion process represents a method for making still higher molecular weight products therefrom, with Mooney viscosities of up to about 50 or better.

Nevertheless, despite the general tendency of the polymer substrates of this invention to increase in molecular weight as a result of the dispersion process, and even to yield a crumb at the expense of fine powder when the initial molecular weight is high enough, it has surprisingly been found that incorporating a free radical inhibitor into the dispersion will substantially suppress the molecular weight increase and the tendency to form a crumb.

The inhibitors useful for this purpose are well known in the art and are generally useful to prevent oxidation and/or degradation of polymers during processing. A very effective inhibitor is Santowhite Crystals NC11-008 [4,4'-Thiobis 6-tertiary butyl-m-cresol] available from Monsanto Chemicals Co. Butylated hydroxytoluene is also effective but its use may be accompanied by product staining. Nearly any antioxidant can be used, including both phenolic and amine antioxidants.

Phenolic antioxidants include hydroquinone derivatives such as the monomethyl ether of hydroquinone; disubstituted cresols, e.g., 2,6-di-tert-butyl-p-cresol; bisphenols such as 2,2'-methylenebis (4-methyl-6-tert-butylphenol); catechol derivatives, e.g., di-o-tolylguanidine salt of dipyrocatechol borate; naphthol derivatives, e.g., 1,1'-methylenebis-2-naphthol; substituted phenols, e.g., styrenated phenols; other phenol types, e.g., butylated 4,4'-isopropylidenediphenol; amino-phenols, e.g., N-lauroyl-p-aminophenol.

Amine antioxidants include primary polyamines, e.g., p,p'-diamino-diphenylmethane; diarylamines, e.g., N-phenyl-β-naphthylamine; bisdiarylamines, e.g., N,N'-diphenyl-p-phenylene-diamine; alkylated diarylamines, e.g., monooctyl- and dioctyl-diphenylamine mixtures; ketone-diarylamine condensation products; dihydroquinolines, e.g., 1,2-dihydro-2,2,4-trimethyl-6-phenyl-quinoline; aldehyde-amine condensation products, e.g., butyraldehyde-aniline condensation products; alkylarylamines, e.g., N,N'-diphenylethylenediamine; aldehyde imines, e.g., N,N'-disalicylal-ethylenediamine. Additional classes of antioxidants are: alkyl aryl phosphates; dithiocarbamates; thiazyl derivatives; thiuram disulfides; thiodipropionates; benzophenones, and carbon black. Mixtures of the various anitoxidants may be used.

The amount of antioxidant, or inhibitor, employed does not appear to be critical as long as an effective amount is employed. For efficiency, large excesses, of course, should be avoided, while less than effective amounts will provide less than total inhibition. For most systems, a level of about 0.5% by weight based on the polymer substrate will suffice. In general, from about 0.3 to about 1% by weight of inhibitor is a reasonable operating range.

The dispersed product obtained in accordance with the present invention apparently undergoes some chemical change during the dispersion process as is evidenced by a reduction in the apparent vinyl acetate content of the dispersed polymer. These reductions are indeed small and probably result from saponification of the ester groups of the substrate polymer in the alkaline dispersion medium, the alkalinity being the result of hydrolysis of the metal soaps. The degree of saponification is usually about 1% although in some cases it amounted to between 2% and 3%. Thus, the products of the dispersion are, in the case of ethylene-vinyl acetate substrate, ethylene-vinyl acetate-vinyl alcohol terpolymers, with the vinyl alcohol being at low percent values.

As employed herein, the phrase "a dispersing system comprising an alkali metal soap of a higher carboxylic acid" is meant to embrace those systems wherein the said soap requires the presence of an added salt, as defined herein, and those systems wherein the said soap does not require the presence of an added salt, as defined herein, to obtain the desired dispersion of the substrate polymer. Thus, with the low carbon content soaps such as myristates, i.e. up to sixteen carbon atoms, an added salt is required to obtain the desired fine dispersions of the polymer with concentrations of from about 5 to about 10 parts of the soap per hundred parts of polymer. With higher carbon content soaps, i.e. above 16 carbon atoms, added salt is not normally required to obtain the desired dispersions.

The dispersions of the polymer substrate produced in accordance with the present invention are generally composed of particles, usually spherical, of average diameter ranging from about 20 microns up to about 500 microns, with the vast majority (80–90%) of particles being less than 250 microns. With the preferred dispersing systems, a substantial majority of the particles are less than about 150 microns, usually ranging from about 20 to about 150 microns with most of the particles being in the range of about 50 to about 100 microns. As should be expected, the efficiency of the present dispersion process and the particle size of the dispersed product will vary to a certain extent with the selected soap and salt, the temperature, the amounts of reagents employed and other factors with which those skilled in the art are familiar.

The dispersion product as obtained can be used as such, or alternatively can be subjected to screening to isolate specific particle size product. Especially valuable are particles in the range of from about 40 to about 150 microns, which are especially useful for coating formation.

The relative molecular weights of the polymers of this invention are compared by means of their melt flow rates and/or their Mooney viscosities. Melt flow rate, abbreviated MFR, was determined according to ASTM D 1238-73, Condition B. In some cases Condition E of this procedure was used; such melt flow rates are called "melt indexes" herein. Mooney viscosities were determined according to ASTM D 1646-74. The polymers of this invention were also characterized by means of their vinyl acetate content. The vinyl acetate content was determined by a special saponification procedure involving the use of toluene as a solvent and ethanolic KOH solution as the saponifying agent. The results are reported as weight-percent vinyl acetate, abbreviated as "Wt. % VA."

The following examples further illustrate the invention.

GENERAL DISPERSION PROCEDURE

The dispersion experiments were performed in a cylindrical one-liter, Monel metal pressure reactor (Parr Instrument Company) equipped with a thermowell, a safety head, a stirrer bearing shaft and a pressure gage. Power was supplied to the stirrer by means of a drill press driven by a one-horsepower motor (d.c.). The stirrer impellers comprised two carved-tooth turbine-type discs. To the pressure reactor was added the distilled water, the polymer substrate and the dispersing system. Heat was applied until the desired temperature was reached. Stirring was then started and continued at a rate in the range of 2800-3800 rpm for a period of 8 to 10 minutes. Stirring was then reduced to about 1500 rpm and the reactor was cooled externally with dry ice until the temperature of the contents was about 90° C. The dispersion was diluted with an equal volume of water. The dispersions were routinely observed with an optical microscope, (Bausch and Lomb, Model CTA) to assess relative particle size, shape and complexity. For isolation of the tacky particles as dry powders, a parting agent was provided as described hereinafter.

EXAMPLE I

Using the general dispersion procedure, various soaps are evaluated at 235° C. in the dispersion of an ethylene-vinyl acetate copolymer containing 42.2% by weight of vinyl acetate and having a melt flow rate of 1.2 g/10 min. (VYNATHENE EY 901, U.S. Industrial Chemicals Co.).

The charge consists of 450 ml. water and 150 g. of the copolymer plus surfactant and, in some cases, sodium chloride as indicated. Sodium behenate and sodium myristate are prepared by neutralization of the corresponding acids with sodium hydroxide. Sodium stearate employed is U.S.P. grade.

The results are given in Table I from which it is apparent that at levels of 5 and 10 pph, based on copolymer, sodium myristate functions as a dispersant only in the presence of sodium chloride, i.e. added salt, but only at the upper levels, e.g. at 5.8 pph of sodium chloride, based on copolymer, no dispersion is obtained but at 11.7 and 17.5 pph dispersion is obtained, yet the yields are only fair. Conversely, sodium behenate alone at both 5 and 10 pph gives dispersion, which is also true at the lower level of salt, and excellent yields can be obtained. However, with the upper salt level no dispersion is obtained.

These phenomena may be explained in terms of the relative water-solubility of the respective soaps, the myristate being substantially more soluble than the behenate. Thus, at high salt levels, the salt causes the behenate to be even less soluble in the dispersing medium and perhaps more soluble in the copolymer itself, to the extent that the dispersant is substantially ineffective in coating the polymer. The myristate on the other hand is so soluble in the dispersing medium that higher levels of salt are required to cause effective coating of the polymer which appears to be a necessary prerequisite to dispersion formation.

Of course, this explanation is purely theoretical and is offered to attempt a better explanation of the observed phenomena. However, applicant does not wish to be bound to such theoretical explanation.

The dispersions, when formed in the presence of added salt tended to consist of particles that were agglomerates of even finer primary particles, as established by microscopic observation.

As clearly demonstrated, the behenate salts are apparently sufficiently insoluble to effect coating the polymer substrate so that added salt is not necessary, and in fact, at the upper level, is undesirable since no dispersion occurs.

TABLE I

| | INFLUENCE OF ADDED SALT ON THE DISPERSIBILITY OF VYNATHENE EY901 WITH SELECTED SOAPS AT 235° C. | | | | | | |
|---|---|---|---|---|---|---|---|
| Exp. No. | Soap Name | g. | pph/1/ | NaCl g. | pph/1/ | Dispersion | Percent Yield of Dispersed Copolymers |
| 1 | Sodium myristate | 15.0 | 10 | — | — | no | — |
| 2 | Sodium myristate | 7.5 | 5.0 | 8.75 | 5.8 | no | — |
| 3 | Sodium myristate | 7.5 | 5.0 | 17.5 | 11.7 | no | — |
| 4 | Sodium myristate | 7.5 | 5.0 | 26.25 | 17.5 | yes | 83.1 |
| 5 | Sodium myristate | 15 | 10 | 17.5 | 11.7 | yes | 75.1 |
| 6 | Ivory Soap /2/ | 8.82 | 5 | — | — | no | — |
| 7 | Ivory Soap /2/ | 17.65 | 10 | — | — | no | — |
| 8 | Ivory Soap /2/ | 8.82 | 5 | 8.75 | 5.8 | yes | 87.9 |
| 9 | Ivory Soap /2/ | 17.65 | 10 | 17.5 | 11.7 | yes | 92.0 |
| 10 | Sodium stearate | 7.5 | 5.0 | — | — | no | — |
| 11 | Sodium stearate | 15.0 | 10.0 | — | — | yes | 83.6 |
| 12 | Sodium stearate | 7.5 | 5.0 | 8.75 | 5.8 | yes | 88.5 |
| 13 | Sodium stearate | 15 | 10 | 17.5 | 11.7 | yes | 99+ |
| 14 | Sodium behenate | 7.5 | 5.0 | — | — | yes | 54 |
| 15 | Sodium behenate | 15.0 | 10.0 | — | — | yes | 92.5 |
| 16 | Sodium behenate | 7.5 | 5.0 | 8.75 | 5.8 | yes | 100 |
| 17 | Sodium behenate | 15.0 | 10.0 | 17.5 | 11.7 | no | — |

/1/Based on copolymer.
/2/Soap content: 85%

EXAMPLE 2

The procedure of Example 1 is repeated using stearate and behenate soaps with different cations. The results appear in Table II along with some of the data from Table I.

Under comparable conditions in the presence of added sodium chloride, lithium, sodium, and potassium stearate produced a dispersion with the yield of dispersed material increasing in that order. Ammonium stearate did not produce a dispersion under the same conditions.

Comparison of lithium and sodium behenate in the absence of sodium chloride shows that the lithium soap produced no dispersion at all while sodium behenate gave a good yield of dispersed material. The last experiment in Table II suggests that the optimum salt level for the stated conditions has been exceeded.

TABLE II

| Soap | | | NaCl | | Dispersion | Percent Yield of Dispersed Copolymer |
|---|---|---|---|---|---|---|
| Name | g. | pph/1/ | g. | pph/1/ | | |
| Lithium stearate | 7.5 | 5.0 | — | — | no | — |
| Lithium stearate | 7.5 | 5.0 | 8.75 | 5.8 | yes | 71.7 |
| Sodium stearate | 7.5 | 5.0 | — | — | no | — |
| Sodium stearate | 7.5 | 5.0 | 8.75 | 5.8 | yes | 88.5 |
| Potassium stearate | 7.5 | 5.0 | 8.75 | 5.8 | yes | 91 |
| Ammonium stearate | 7.5 | 5.0 | 8.75 | 5.8 | no | — |
| Lithium behenate | 15.0 | 10.0 | — | — | no | — |
| Sodium behenate | 7.5 | 5.0 | — | — | yes | 54 |
| Sodium beheante | 15 | 10 | — | — | yes | 92.5 |
| Sodium behenate | 7.5 | 5.0 | 8.75 | 5.8 | yes | 100 |
| Sodium behenate | 15 | 10 | 17.5 | 11.7 | no | — |

/1/Based on Copolymer

EXAMPLE 3

The procedure of Example 1 is repeated with the exception that the dispersion is carried out at 149° C. and at 235° C. in the presence and in the absence of sodium chloride.

The charge at each temperature is 450 ml. water, 150 g. VYNATHENE EY901, 15. g. sodium stearate and, where present, 17.5 g. sodium chloride.

The nature and relative size of the dispersed particles was assessed by observing the dispersions under an optical microscope. It was noted that the primary particles produced in the presence of sodium chloride were much smaller than those formed in the absence of sodium chloride, under otherwise comparable conditions. This observed effect of sodium chloride in producing smaller particles from the polymers of the present invention is in accord with the effect of sodium chloride on particle size found for polymers of lower comonomer content. As a complicating factor in the dispersion of the polymer of this example, however, it was also noted that the primary particles produced in the presence of sodium chloride agglomerate extensively into larger aggregates, but comparatively little agglomeration of primary particles is observed in dispersions made in the absence of sodium chloride. The net effect is that the ultimate particles obtained in the presence of sodium chloride appear to be larger.

Because of the tacky nature of the resin, it is not possible to recover the dispersed particles by conventional methods, e.g., filtration. If filtration is attempted, the particles coalesce on the filter. Nevertheless, techniques have been worked out that permit the recovery of the particles as a dry powder. Such techniques are more fully described in a copending application (2390), and involve, for example, addition of sufficient calcium hydroxide solution to the dispersions to precipitate the sodium stearate as the calcium stearate or first acidifying to convert sodium stearate to stearic acid and then optionally adding an additional amount of preformed calcium stearate. Either method will produce a powder that can be dried without difficulty and sieved.

From the sieve analysis in Table III, it is evident that at both dispersion temperatures investigated, 149° C. and 235° C., coarser powders were obtained in the presence of sodium chloride. Thus, at 149° C., in the presence of sodium chloride, about 71% of the powder isolated had particle diameters below 149 micron with about 28% above 149 microns. Whereas, in the absence of sodium chloride, only about 11% of the product was above 149 microns (all on weight basis). At 235° C. the same trend is again observed with about 56% of the particles above 149 microns in the presence of sodium chloride and only about 37% above 149 microns in the absence of sodium chloride.

TABLE III
EY 901. EFFECT OF SODIUM CHLORIDE ON PARTICLE SIZE

| Particle Diameter, Microns | Dispersion at 149° C.(2) | | Dispersion at 235° C.(3) | |
|---|---|---|---|---|
| | NaCl present, %(1) | NaCl absent, %(1) | NaCl present, %(4) | NaCl absent, %(1) |
| 420–500 | 15.5 | — | 6.5 | 0.6 |
| 250–420 | 3.4 | — | 23.1 | 3.2 |
| 177–250 | 6.0 | 4.1 | 20.9 | 13.0 |
| 149–177 | 4.3 | 6.7 | 5.2 | 20.0 |
| 106–149 | 19.8 | 21.7 | 13.9 | 29.4 |
| 74–106 | 50.9 (<106 μ) | 23.3 | 30.4 (<106 μ) | 33.8 (<106 μ) |
| 53–74 | — | 20.0 | — | — |
| 37–53 | — | 4.2 | — | — |
| <37 | — | 10.0 | — | — |

(1)Ca(OH)₂ soluton added to dilute dispersion to precipitate Ca stearate for prevention of particle coalescence.
(2)EY 901: MFR, 1.2 g/10 min., VA = 42.2 wt. %
(3)EY 901: MFR, 1.6 g/10 min., VA = 44.7 wt. %
(4)Add 5 pph of Ca stearate after acidification to prevent particle coalescence.

EXAMPLE 4

The procedure of Example 3 was repeated with the exception that the copolymer dispersed was VYNATHENE EY902, an ethylene vinyl acetate copolymer containing 39.0 wt.% vinyl acetate and having an MFR of 4.5 g/10 min. The charge in all experiments was 450 ml of water, 150 g of VYNATHENE EY902, 15 g sodium stearate and, when present, 17.5 g of sodium chloride. The dispersions were converted to dry powders for sieve analysis by acidification of the sodium stearate dispersant in the cooled dispersion followed by addition of 7pph on resin of calcium stearate. The sieve analyses are presented in Table IV for dry powders obtained by dispersing VYNATHENE EY902 at 149° C. and at 235° C., both in the absence and in the presence of sodium chloride. At 149° C., with this lower molecular weight copolymer, about 18% of the particles are above 149 microns when sodium chloride is present during dispersion, and only about 5% when sodium chloride is absent. The trend to coarser particles i.e. agglomerates in the presence of added salt is discernible but not pronounced. At a dispersion temperature of 235° C., however, almost all the product had a particle size greater than 149 microns when sodium chloride was present during dispersion, whereas only about 14% was greater than 149 microns when sodium chloride was absent during dispersion.

ification of the sodium stearate dispersant, followed by filtration.

At 235° C., all three lots of resin gave powder products (Table V). For the resins of Lots 1 and 2, there was an upward trend in molecular weight as a result of the dispersion process (from Mooney viscosities of 12-13 to 20-22). However, resin of lot 2 was anomalous. It suffered a considerably greater jump in molecular weight as a result of the dispersion process, to a Mooney viscosity of 36. And at a dispersion temperature of 185° C., a crumb was obtained from resin of lot 3 that had Mooney viscosity of 43. None of these products contained detectable amounts of gel.

TABLE V

Low Mooney EY 901.
Effect of Dispersion Process on Molecular Weight

|  | Resin Lot 1 | | Resin Lot 2 | | Resin Lot 3 | | |
| --- | --- | --- | --- | --- | --- | --- | --- |
|  | Original | Product | Original | Product | Original | Product I | Product II |
| Dispersion Temp., ° C. | — | 235 | — | 235 | — | 185 | 235 |
| VA, wt. % | 42.22 | — | 43.4 | 41.68 | 38.58 | — | — |
| MFR, g/10 min. | 1.2 | — | 1.54 | 0.63 | 1.24 | — | — |
| Mooney Viscosity, ML (1 + 4) at 212° F. | 12 | 22 | 13 | 20 | 12 | 43 | 36 |
| Gel Content, (1) | 0 | 0 | — | — | 0 | — | 0 |
| Appearance | Pellets | Powder | Pellets | Powder | Pellets | Crumb | Fluffy powder |

(1) Xylene, 110° C., 24 hrs. Gel determined by weighing insolubles.

TABLE IV

EY 902.
EFFECT OF SODIUM CHLORIDE ON PARTICLE SIZE

| Particle | Dispersion at 149° C. | | Dispersion at 235° C. | |
| --- | --- | --- | --- | --- |
| diameter microns (1) | NaCl present, % | NaCl absent, % | NaCl present, % | NaCl absent, % |
| 420-500 | 2.7 | — | 34.2 | — |
| 250-420 | 5.4 | — | 49.2 | — |
| 177-250 | 5.4 | — | 10.8 | 4.5 |
| 149-177 | 4.0 | 4.1 | 4.2 | 9.7 |
| 106-149 | 18.0 | 42.7 | 0.8 | 35.0 |
| 74-106 | 23.9 | 28.2 | 0.8 | 25.9 |
| 53-74 | 38.7 | 8.0 | — | 3.1 |
| 37—53 | 0.9 | 2.0 | — | 1.2 |
| <37 | 0.9 | 15.0 | — | 0.6 |

(1) After acidification, 7 pph of calcium stearate added to semi-dry filter cake.

EXAMPLE 5

The general procedure was employed with three different lots of low Mooney VYNATHENE EY901 that had MFR values in the range of 1.2 to 1.54 g/10 min. (Mooney viscosities of 12 to 13). The charge to each experiment was 450 ml of water, 150 g of VYNATHENE EY901, 15 g of sodium stearate and 17.5 g of sodium chloride. The dispersion temperature was 235° C. (185° C. in one experiment). Dispersion times were 7 minutes. The dispersed copolymer was isolated by acid-

EXAMPLE 6

The procedure of Example 5 was repeated with two different lots of high Mooney VYNATHENE EY901 i.e., polymer having Mooney viscosities of 19-23 before dispersion. The dispersion temperature was 235°-240° C. Table VI summarizes the results. The principal product recovered from dispersion of each lot of resin was a crumb. Each crumb product exhibited an elevated molecular weight compared to the parent resin. Thus resin lot 4 with an initial Mooney viscosity of 23 yielded a crumb product with a Mooney viscosity of 54, and resin lot 5 increased in Mooney viscosity from 19 up to 43 as a result of dispersion. None of these products contained gel, but there was a definite drop in vinyl acetate content of each product, as compared to the original resin. This amounted to 1.3 to 1.4 weight percent (4.1–4.2 mole %), and suggests that a small amount of hydrolysis occurs. Therefore the product of dispersion does contain small amounts of vinyl alcohol residues.

TABLE VI

High Mooney EY 901.
Effect of Dispersion Process on Molecular Weight
(Dispersion Temperature, ° C. = 235-240)

|  | Resin Lot 4 | | Resin Lot 5 | | |
| --- | --- | --- | --- | --- | --- |
|  |  |  | | Products (1) | |
|  | Original | Product | Original | I | II |
| VA, wt % | 41.5 | 40.08 | 42.9 | — | 41.60 |
| MFR, g/10 min | 0.42 | — | 0.75 | — | No flow |
| Mooney Viscosity, ML (1 + 4) at 212° F. | 23 | 54 | 19 | — | 43 |
| Product Recovered, % | — | — | — | 7.3 | 83 |
| Gel Content, % (2) | 0 | 0 | 0 | 0 | 0 |
| Appearance | Pellets | Crumb | Pellets | Powder | Crumb |

(1) both products from the same experiment
(2) Xylene, 110° C., 24 hr. Gel determined by weighing insolubles

EXAMPLE 7

The procedure of Example 6 was repeated except that 0.5 weight percent, based on resin charged, of Santowhite Crystals [4.4'-thiobis (6-tert.-butyl-m-cresol)], supplied by Monsanto Chemical Co., was added along with the other materials placed in the reactor before each dispersion experiment. The dispersion experiments were carried out at 235° C. Powder products were now obtained from each of the high Mooney EY901 resins, which, as shown in Example 6, had yielded crumb products in the absence of Santowhite Crystals (Table VII). Both Mooney viscosity and MFR measurements on the powder products revealed that there was no substantial upward shift in molecular weight. Resin lot 4, which increased in Mooney viscosity from an initial 23 to a final 54 after dispersion without added inhibitor (Table VI), increased to only 26 when Santowhite Crystals were present during the dispersion. Resin lot 5, in the presence of Santowhite Crystals, actually suffered a small decrease in Mooney viscosity, from 19 down to 14.

TABLE VII

High Mooney EY 901
Effect of Dispersion Process on Molecular Weight with 0.5 wt. % Santowhite Crystals Present During Dispersion
(Dispersion Temperature, ° C. = 235)

|  | Resin Lot 4 | | Resin Lot 5 | |
|---|---|---|---|---|
|  | Original | Product | Original | Product |
| VA, wt. % | 41.5 | 40.5 | 42.9 | 38.0 |
| MFR, g/10 min | 0.42 | 0.32 | 0.75 | 1.34 |
| Mooney Viscosity, ML (1 + 4) at 212° F. | 23 | 26 | 19 | 14 |
| Gel content, % (1) | 0 | — | 0 | 0 |
| Appearance | Pellets | Powder | Pellets | Powder |

(1) Xylene, 110° C., 24 hours. Gel determined by weighing insolubles.

larly obtained with EY907 resins initially having MFR's 1.2 to 1.3.

As in the dispersion of the copolymer of Examples 5 and 6, which contain 40% VA, there is again an upward trend in molecular weight to be noted in the dispersion of this 60% VA copolymer. The extent of the increase was again greatest for the lot of resin having the highest initial molecular weight, and the change was greater at the lower dispersion temperature (185° C.) than at the higher dispersion temperature (235° C.) (Experiments 1 and 2). At 185° C. a crumb product was obtained that had a Mooney viscosity of 34.5. This high Mooney product was gel-free.

TABLE VIII

EY 907. Dispersion with Sodium Stearate

| | | EY 907 | | | Dispersion Conditions | |
|---|---|---|---|---|---|---|
| Exp. No. | Lot No. | VA wt. % | MFR g/10 min | Mooney Viscosity ML(1 + 4) at 212° F. | Temp. ° C. | Time min |
| 1 | 1 | 58.75 | 0.60 | — | 235 | 7 |
| 2 | 1 | 58.75 | 0.60 | — | 185 | 7 |
| 3 | 2 | 60 | 1.2 | 17 | 235 | 7 |
| 4 | 2 | 60 | 1.2 | 17 | 185–190 | 7 |
| 5 | 2 | 60 | 1.2 | 17 | 185 | 9 |
| 6 | 2 | 60 | 1.2 | 17 | 185 | 9 |
| 7 | 2 | 60 | 1.1 | 17 | 185 | 9 |
| 8 | 3 | 58.37 | 1.3 | 14 | 235 | 7 |
| 9 | 3 | 58.37 | 1.3 | 14 | 185 | 7 |

TABLE IX

EY 907. Dispersion with Sodium Stearate

| | | | Characterization (1) | |
|---|---|---|---|---|
| Exp. No. | Yield | Appearance | MFR g/10 min | Mooney Viscosity ML (1 + 4) at 212° F. |
| 1 | fair | fine material plus large ring of solid material | — | 28.5 (2) |
| 2 | fair | crumb | — | 34.5 (2) |
| 3 | 80 | fine material plus some undispersed material | 0.26 | 24 |
| 4 | 100 | fine dispersion | 0.5 | 20.5 |
| 5 | 100 | fine dispersion, very little undispersed material | — | — |
| 6 | 96+ | fine dispersion. Treated with Ca(OH)$_2$ solution to produce dry powder. Fails compaction test (1) | — | — |
| 7 | 98 | fine dispersion; dilute, treat with Ca(OH)$_2$ solution, add additional Ca stearate. Total Ca stearate 16.36%; passes compaction test (1) | — | — |
| 8 | none | — | — | — |
| 9 | high | fine material plus some chunks | 0.34 | 21.5 |

(1) Powder subjected to psi load for 24 hrs. at 40° C. Specimens not fusing passed the test
(2) Gel content zero.

EXAMPLE 8

The general procedure was repeated employing VYNATHENE EY907 as the ethylene-vinyl acetate copolymer to be dispersed. VYNATHENE EY907 nominally contains about 60 weight percent of vinyl acetate and has an MFR of about 0.5 to 1.5. Several different lots of EY 907 were tested. Sodium stearate was used as the dispersing agent. No salt was added, nor was an inhibitor employed.

In each experiment the charge was 450 ml of water, 150 g of EY 907 and 15 g of sodium stearate. Dispersion temperatures were 185°–191° C. or 235° C. In a few experiments the dispersed polymer was isolated as a dry powder by techniques described in Example 3. Results are shown in Tables VIII and IX.

The dispersion process is at best marginal at 235° C. and even failed in one instance (Experiments 1, 3 and 8), whereas at 185°–191° C., good dispersions were regu-

EXAMPLE 9

The procedure of Example 8 was repeated, but other soaps were tested in place of sodium stearate (Table X). Sodium chloride was added in two experiments. The charge to each experiment was 450 ml of water, 150 g of EY 907, and 15 g of soap. The EY 907 employed was lot No. 2, Table VIII. The dispersions were performed at 185°–190° C. and at 235° C. At the end of some of the dispersion experiments the aqueous phase was separated from the polymer and evaporated. From the amount of residue, inferences can sometimes be drawn as to the fate of the soap.

At 235° C. none of the soaps tried in Table X gave a dispersion of EY 907 under the stated conditions, whereas at the lower temperature (185°–190° C.), dispersions were always produced. Ammonium decanoate (Experiment 1) failed to disperse at 235° C. and apparently migrated into the polymer since little was recovered from the aqueous phase. Sodium decanoate (Experiment 2) was also ineffective at 235° C., but most of it remained in the aqueous phase. Sodium myristate (Experiment 3) was similarly ineffective at 235° C. At 185°–190° C., however, sodium myristate gave high dispersion yields, alone and in the presence of added sodium chloride (Experiments 4–6). Sodium behenate yielded a dispersion at 188° C. but not at 235° C. (Experiments 7 and 8). Lithium behenate, a very water-insoluble soap, produced no dispersion at 235° C. but yielded a coarse dispersion at 185° C. (Experiments 9–10).

TABLE X

EY 907. Dispersion With Soaps Other Than Sodium Stearate

| Exp. No. | Soap | NaCl, g. | Temp., °C. | Time, min. | Yield of Dispersed Product, % | Remarks |
|---|---|---|---|---|---|---|
| 1 | Ammonium decanoate | — | 235 | 7 | none | Less than 0.5 g residue upon evaporation of aqueous phase. |
| 2 | Sodium decanoate | — | 235 | 7 | none | 11.0 g residue upon evaporation of aqueous phase. |
| 3 | Sodium myristate | — | 235 | 7 | none | — |
| 4 | Sodium myristate | — | 185 | 9 | ~100 | A few chunks in dispersion. |
| 5 | Sodium myristate | 5.8 | 185–190 | 9 | 84 | — |
| 6 | Sodium myristate | 8.75 | 185 | 7 | 100 | Fine dispersion. |
| 7 | Sodium behenate | — | 235 | 7 | none | — |
| 8 | Sodium behenate | — | 188 | 9 | 100 | Fine dispersion. |
| 9 | Lithium behenate | — | 235 | 7 | none | No residue upon evaporation of aqueous phase. |
| 10 | Lithium behenate | — | 185 | 7 | — | Coarse dispersion. No residue upon evaporation of aqueous phase. |

EXAMPLE 10

The general dispersion procedure was repeated employing a dimerized fatty acid to disperse VYNATHENE EY 901 ethylene-vinyl acetate copolymer. To the 1-liter reactor was charged 450 ml of water, 150 g of EY 901 (40.0 wt.% vinyl acetate; MFR 1.4 g/10 min), 12.6 g (or 0.0442 equivalent) Hystrene 3695, and 1.75 g (or 0.0438 equivalents) of sodium hydroxide pellets. Hystrene 3695 is a dimerized fatty acid containing, according to the manufacturer, Humko Sheffield Chemical, an operation of Kraftco Corporation, Hinsdale, Illinois, 95% dimer acid, 4% trimer acid and 1% monomer acid. The reactor was closed and heated to 199° C. The agitator was immediately turned on (3700 rpm) and agitation was continued for 7 minutes. Dry ice was applied to the outside of the reactor to cool it. Slow agitation was employed after the 7 minute rapid stirring period. When the temperature had fallen just below 100° C., the reactor was opened. The EY 901 was 100% dispersed. Microscopic examination of the dispersion showed that it consisted of spherical particles of variable diameter.

These results show that the polymer substrate can be dispersed with a soap of a dibasic acid prepared in situ.

EXAMPLE 11

The general dispersion procedure was repeated employing a soap of a polymerized rosin acid as the dispersant for EY 901. To the 1-liter reactor was charged 450 ml of deionized water, 150 g of the VYNATHENE EY 901 resin of Example 10, 14.1 g (or 0.0385 equivalents) of Polypale Resin a polymerized rosin acid supplied by Hercules Incorporated, and 1.54 g (0.0385 equivalents) of sodium hydroxide pellets. The reactor was closed and heated to 200° C. Stirring was started immediately (3700 rpm) and was continued for 7 minutes. Full torque to the stirrer was required in the first 30 seconds, but the agitation was otherwise smooth. Dry ice was applied to the outside of the reactor to cool to below 100° C. Upon opening the reactor, it was found that 100% of the EY 901 was dispersed. Microscopic examination of the dispersion showed that the dispersed material consisted of microscopic spheres, as well as spherical and club-shaped particles.

EXAMPLE 12

The general dispersion procedure was repeated employing a soap of dehydrogenated rosin acid as the dispersant for VYNATHENE EY 901. To the 1-liter autoclave was charged 450 ml of deionized water, 150 g of the polymer of Example 10, 14.1 g (or 0.0385 equivalents) of Resin 731D, a dehydrogenated rosin acid supplied by Hercules Incorporated, and 1.54 g (or 0.0385 equivalents) of sodium hydroxide pellets. The reactor was heated to 200° C., stirring was started and applied for 7 minutes. After the 7-minute period slower stirring was employed and cooling with dry ice applied. When the reactor had cooled to below about 100° C., it was opened. The EY 901 was 100% dispersed. Microscopic examination of the dispersion showed that the dispersed material consisted of microscopic spheres as well as spheroidal and club-shaped particles.

What we claim is:

1. A process for dispersing an olefin polymer containing from about 35% to about 85% polar comonomer consisting essentially of stirring said polymer in molten state in an aqueous dispersion system comprising an alkali metal soap and cooling the resulting hot dispersion with the polymer in the disperse state to below about 100° C., said dispersion being formed in the absence of discharge of the hot dispersion through a restricted orifice into a zone of reduced pressure, the particles comprising the cooled dispersion having an average diameter ranging from about 20 microns up to about 500 microns, with the majority of particles being less than 250 microns.

2. A process according to claim 1 wherein said dispersion system comprises a soap of a saturated fatty acid of from about 10 to about 22 carbon atoms.

3. A process according to claim 1 wherein the polymer is an ethylene polymer.

4. A process according to claim 1 wherein the polymer is an ethylene-vinyl acetate copolymer.

5. A process according to claim 1 wherein the weight ratio of polymer to water in said dispersion system is from about 0.1:1 to about 3:1, the weight ratio of soap to polymer is from about 0.01:1 to about 0.3:1.

6. A process for dispersing an olefin polymer containing from about 35% to about 85% polar comonomer consisting essentially of stirring said polymer in molten state in an aqueous dispersion system comprising an alkali metal soap in the presence of a free radical inhibitor and cooling the resulting hot dispersion with the polymer in the disperse state to below about 100° C., said dispersion being formed in the absence of discharge of the hot dispersion through a restricted orifice into a zone of reduced pressure, the particles comprising the cooled dispersion having an average diameter ranging from about 20 microns up to about 500 microns, with the majority of particles being less than 250 microns.

7. A process according to claim 6 wherein said dispersion system comprises a soap of a saturated fatty acid of from about 10 to about 22 carbon atoms.

8. A process according to claim 6 wherein said soap comprises an alkali metal stearate.

9. A process according to claim 6 wherein said polymer is an ethylene polymer.

10. A process according to claim 6 wherein said polymer comprising an ethylene-vinyl acetate copolymer.

* * * * *